June 2, 1931.  R. C. MONTEAGLE  1,808,057
PISTON RING
Filed March 25, 1929
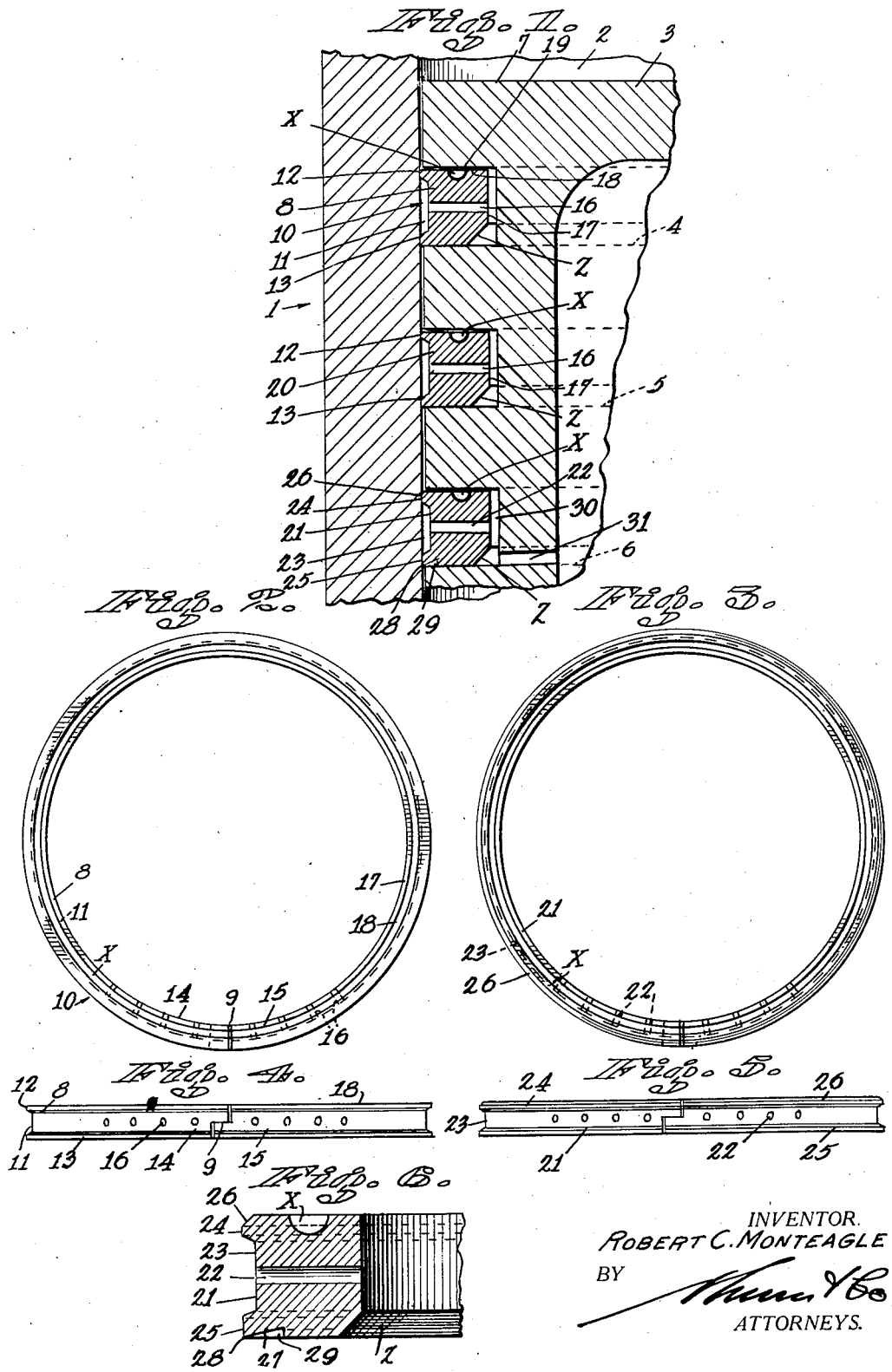
INVENTOR.
ROBERT C. MONTEAGLE
BY
ATTORNEYS.

Patented June 2, 1931

1,808,057

UNITED STATES PATENT OFFICE

ROBERT C. MONTEAGLE, OF SAN FRANCISCO, CALIFORNIA

PISTON RING

Application filed March 25, 1929. Serial No. 349,837.

My invention relates to improvements in piston rings, and more particularly to that type of piston ring wherein novel constructions of the ring function to give higher compression, to prevent leakage, to lubricate the cylinder walls, and to save fuel and oil. The present invention consists in the combinations, constructions and arrangements hereinafter described and claimed.

I have found by actual experiment that the pressure within a combustion chamber ordinarily does not travel past the outer surface of the piston ring, but travels around the rings, thus creating a tendency to force the ring into such close contact with the cylinder wall as to cause undue wear of the latter.

The primary object of my invention is accordingly to provide a piston ring that not only efficiently lubricates the cylinder wall, but at the same time permits the pressure that normally bears against the inner surface of the piston ring to pass through openings in the ring to the outer surface, this equalizing the pressures on both sides of the ring.

A further object of my invention is to provide a piston ring of the type described which is simple in construction, durable and efficient for the purpose intended.

Other objects and advantages will appear as the specification proceeds, and the novel features will be particularly pointed out in the appended claims.

My invention is illustrated in the accompanying drawings, forming a part of this application, in which Figure 1 is a fragmentary sectional view of a cylinder showing my invention embodied therein;

Figure 2 is a plan view of the two upper rings as shown in Figure 1;

Figure 3 is a plan view of the lowermost ring of Figure 1;

Figures 4 and 5 are side elevations of Figures 2 and 3 respectively; and

Figure 6 is an enlarged sectional detail of a ring that I will later identify as an oil-distributing ring.

In carrying out my invention, I provide a portion of an engine block 1 with a cylinder 2, in which a piston 3 is adapted to reciprocate. The piston is preferably formed with three circumferentially-extending grooves 4, 5 and 6.

The parts thus far described form no part of my invention except in so far as they cooperate with the parts which are now to be set forth.

The upper groove 4, which is arranged adjacent to the top 7 of the piston, has a ring 8 disposed therein. This ring is preferably formed of a resilient material having a split step-joint as indicated by the numeral 9. The ring is formed in its outer face 10 with an annular groove 11, the groove being bounded by side ribs 12 and 13.

It should be noted that the side ribs 12 and 13 are relatively narrow as compared with the width of the ring. This reduces the contacting surface between the ring and the cylinder 2 to a minimum, yet the ribs are of sufficient width to prevent gases from the compartment above the piston from escaping between the wall of the cylinder and the ring.

The ends 14 and 15 are provided with radially-extending perforations 16 which extend from the groove 11 to the inner surface 17 of the ring.

It should be readily appreciated that a small amount of clearance must be left between the side 18 of the ring and the surface 19 of the groove if the resilient force of the ring is to become active. Figure 1 shows this space as being exaggerated for the purpose of clarity.

The ring 20 is identical in construction and operation with the ring 8, and a description of the one will suffice for both. These two rings are commonly termed "compression rings".

The lowermost groove 6 is provided with an oil-collecting ring 21 which bears a marked resemblance to the rings 8 and 20. Perforations 22 extend from the inner surface of the ring and communicate with a groove 23. Ribs 24 and 25, however, are of special construction which will now be described.

The upper rib 24 is beveled as at 26, the purpose of which is to collect lubricant in the groove that is formed between the beveled edge of the ring and the cylinder wall during the upward stroke of the piston. As the piston is so moved, the lubricant is evenly distributed over the cylinder walls.

The lower rib 25 is undercut at 27 so as to present a pointed edge 28 and a cavity 29 which provides a temporary retainer for the oil. As the piston is moved downwardly, the edge 28 directs oil from the cylinder wall into the undercut portion.

The three rings which I have just described are provided on their upper faces with annular grooves X, the purpose of these grooves being to collect oil and form an oil seal. I have also beveled the inner lower edge of the rings, as indicated at Z, so that any gas that may reach this portion of the ring will act to force the ring upwardly until it firmly bears against the upper walls of the grooves in the piston. These two features prevent pumping of oil by the rings, and consequently a waste of the same, and prevent carbonizing as the oil cannot pass into the combustion chamber.

Referring now to Figure 1, it will be noted that a space 30 is provided in rear of the ring 21, it being understood that oil may enter this space through the apertures 22 or from the cavity 29. Passageways 31 are formed in the piston which permits an excessive amount of oil to return to the interior of the piston where it will subsequently drop into the crankcase.

I have arranged the perforations 16 and 22 in the compression rings and oil-distributing ring respectively, near the ends thereof. This construction permits the full strength of the ring diametrically opposite the perforations to be utilized, and thus the ring is not materially weakened by the perforations.

My experiments have proven that pressure exerted upon the top of the piston will not travel downwardly in the space between the piston ring and the cylinder wall, but will pass around the ring through the oil seal and into the space at the back. The pressure will then move through the perforations in the rings into the annular groove 11, and thus equalize the pressure on the inner and outer faces of the ring. This prevents undue wear of the cylinder wall and of the ring, and at the same time the resilience of the ring is sufficient to keep the ring in contact with the cylinder wall.

As the pressure enters the annular grooves 11 and 23 by way of the perforations in the rings, the air or pressure will tend to carry the oil around the groove and thus evenly distribute the oil, and lubricate the rings at the best point of application.

While I have shown only the preferred form of my invention, I wish it to be understood that various changes or modifications may be made within the scope of the appended claims without departing from the spirit of the invention.

I claim:

1. The combination with a cylinder having a piston slidable therein, said piston having an annular groove, of a ring disposed in said groove, one face of said ring having an annular oil groove for forming a seal between the ring and the adjacent wall of said groove, the inner edge of the opposite face of said ring being beveled for forming a cavity so that gases entering therein from the cylinder will force the oil-seal side of said ring firmly against the wall of the piston groove.

2. The combination with a cylinder having a reciprocal piston disposed therein, said piston having an annular grove, of a ring disposed in said groove, the inner lower edge of said ring being beveled for forming a cavity so that gases entering said cavity from the cylinder will force said ring firmly against the upper wall of said groove for forming a seal.

3. The combination with a cylinder having a reciprocal piston disposed therein, said piston having an annular groove, of a ring disposed in said groove, the upper face of said ring having an annular oil groove for forming a seal for preventing the pumping of oil into the top of the cylinder.

4. The combination with a piston slidably disposed in a cylinder and having an annular groove fashioned therein, of a ring disposed in said groove and being slightly movable along the length of the piston, the inner peripheral face of said ring being spaced from the piston for providing a gas passageway, the inner lower edge of said ring being beveled for forming a cavity, whereby gases entering said cavity from the cylinder and through the passageway will force the ring firmly against the upper wall of said groove for forming a seal.

ROBERT C. MONTEAGLE.